(12) United States Patent
Egolf et al.

(10) Patent No.: US 8,993,467 B2
(45) Date of Patent: Mar. 31, 2015

(54) CATALYST REGENERATOR PROCESS

(71) Applicant: UOP LLC, Des Plaines, IL (US)

(72) Inventors: Bryan J. Egolf, Mt. Prospect, IL (US); Feng Xu, Buffalo Grove, IL (US); Raelynn M. Miller, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 49 days.

(21) Appl. No.: 13/970,853

(22) Filed: Aug. 20, 2013

(65) Prior Publication Data

US 2015/0057146 A1 Feb. 26, 2015

(51) Int. Cl.
*B01J 38/40* (2006.01)

(52) U.S. Cl.
CPC ..................... *B01J 38/40* (2013.01)
USPC ........................ 502/39; 423/648.1

(58) Field of Classification Search
USPC ......... 502/39, 38, 50, 52, 53; 423/648.1, 651, 423/652
See application file for complete search history.

(56) References Cited

U.S. PATENT DOCUMENTS

| | | | |
|---|---|---|---|
| 3,904,510 A | 9/1975 | Sinfelt et al. | |
| 4,146,463 A | 3/1979 | Radford et al. | |
| 4,435,281 A | 3/1984 | Vasalos | |
| 4,542,114 A | 9/1985 | Hegarty | |
| 4,617,175 A | 10/1986 | Tolpin et al. | |
| 4,842,843 A | 6/1989 | Pendergraft | |
| 5,034,117 A | 7/1991 | de Bonneville et al. | |
| 5,053,371 A | 10/1991 | Williamson | |
| 5,315,056 A | 5/1994 | Dufallo et al. | |
| 5,498,756 A | 3/1996 | Micklich et al. | |
| 5,958,356 A | 9/1999 | Dong et al. | |
| 6,048,814 A | 4/2000 | Capelle et al. | |
| 6,290,916 B1 | 9/2001 | Sechrist et al. | |
| 6,410,472 B2 | 6/2002 | Macahan et al. | |
| 7,470,412 B2 | 12/2008 | Rosen et al. | |
| 8,062,599 B2 | 11/2011 | Miller | |
| 2004/0029715 A1 | 2/2004 | Harth et al. | |
| 2011/0155642 A1 | 6/2011 | Huziwara et al. | |
| 2011/0207063 A1 | 8/2011 | Wu et al. | |
| 2012/0271073 A1 | 10/2012 | Boon et al. | |

FOREIGN PATENT DOCUMENTS

CA 875528 7/1971
EP 0100531 A2 2/1984

*Primary Examiner* — Edward Johnson

(57) ABSTRACT

A method of operating a continuous or semi-continuous system for a catalyst regeneration process. The system comprises a regenerator, the regenerator comprising a combustion zone and a halogenation zone. The catalyst is fed into the regenerator. A circulating regeneration gas is introduced into a regenerator circuit including oxygen, the circulating regeneration gas having a nitrogen concentration that is less than air. Oxygen from the circulating regeneration gas reacts with the coke to provide water and carbon dioxide. Water and the carbon dioxide formed in this first reaction then further react with the coke to form carbon monoxide and hydrogen.

20 Claims, 2 Drawing Sheets

US 8,993,467 B2

CATALYST REGENERATOR PROCESS

BACKGROUND OF THE INVENTION

Hydrocarbons, and in particular petroleum, are produced from the ground as a mixture. This mixture is converted to useful products through separation and processing of the streams in reactors. Conversion of the hydrocarbon streams to useful products is often through a catalytic process in a reactor. The catalysts can be solid or liquid, and can comprise catalytic materials on a support. In particular, catalytic materials on a solid support are extensively used. Example catalytic materials include platinum group metals and other metals. During the processing of the hydrocarbons, the catalysts deactivate over time. One primary cause of deactivation is the formation and buildup of coke on the catalyst. The accumulation of coke blocks access to catalytic sites on the catalyst, and access to pores within the catalyst. Regeneration of the catalyst is normally performed through the removal of the coke, where the coke is combusted at a high temperature with a gas including oxygen. These processes can be performed either in a continuous manner, with the catalyst cycled through the reactor and the regenerator, or the process can be performed in a semi-continuous manner, such as with multiple fixed beds, where one bed is taken off stream to regenerate the catalyst, while the other beds continue operation.

With the continuous regeneration process, a recycle gas is continuously passed to a combustion zone in the regenerator, and a flue gas containing the combustion process is removed. The combustion process is controlled through the oxygen content in the recycle gas. The recycle gas stream includes a portion of the flue gas, and an additional stream of new combustion gas, while venting another portion of the flue gas from the regenerator. This helps maintain the temperature of the combustion gas, as well as setting up a steady state condition of continuous addition of spent catalyst and combustion gas to the regenerator, while continuously drawing regenerated catalyst and flue gas. Example catalyst regeneration methods are disclosed in U.S. Pat. No. 5,053,371 to Williamson.

The combustion process can be damaging to the catalyst, and thus improved methods of controlling the combustion process are useful for improving the life of the catalyst in a reactor-regenerator cycle. For example, conventional regenerators operate within particular temperature limits. These limits typically are managed by operating under oxygen limitation in an upper part of the regenerator, such that the maximum temperature that can be obtained is bounded by a concentration of oxygen and temperature of the inlet gas. However, this also restricts the driving force for coke removal within the lower portions of the regenerator.

SUMMARY OF THE INVENTION

The present invention involves a method of operating a continuous or semi-continuous system for a catalyst regeneration process. The system comprises a regenerator, the regenerator comprising a combustion zone and a halogenation zone. The catalyst is fed into the regenerator. A circulating regeneration gas is introduced into a regenerator circuit including oxygen, the circulating regeneration gas having a nitrogen concentration that is less than air. Oxygen from the circulating regeneration gas reacts with the coke to provide water and carbon dioxide. Water and the carbon dioxide formed in this first reaction then further react with the coke to form carbon monoxide and hydrogen.

DETAILED DESCRIPTION OF THE INVENTION

Figure 1:
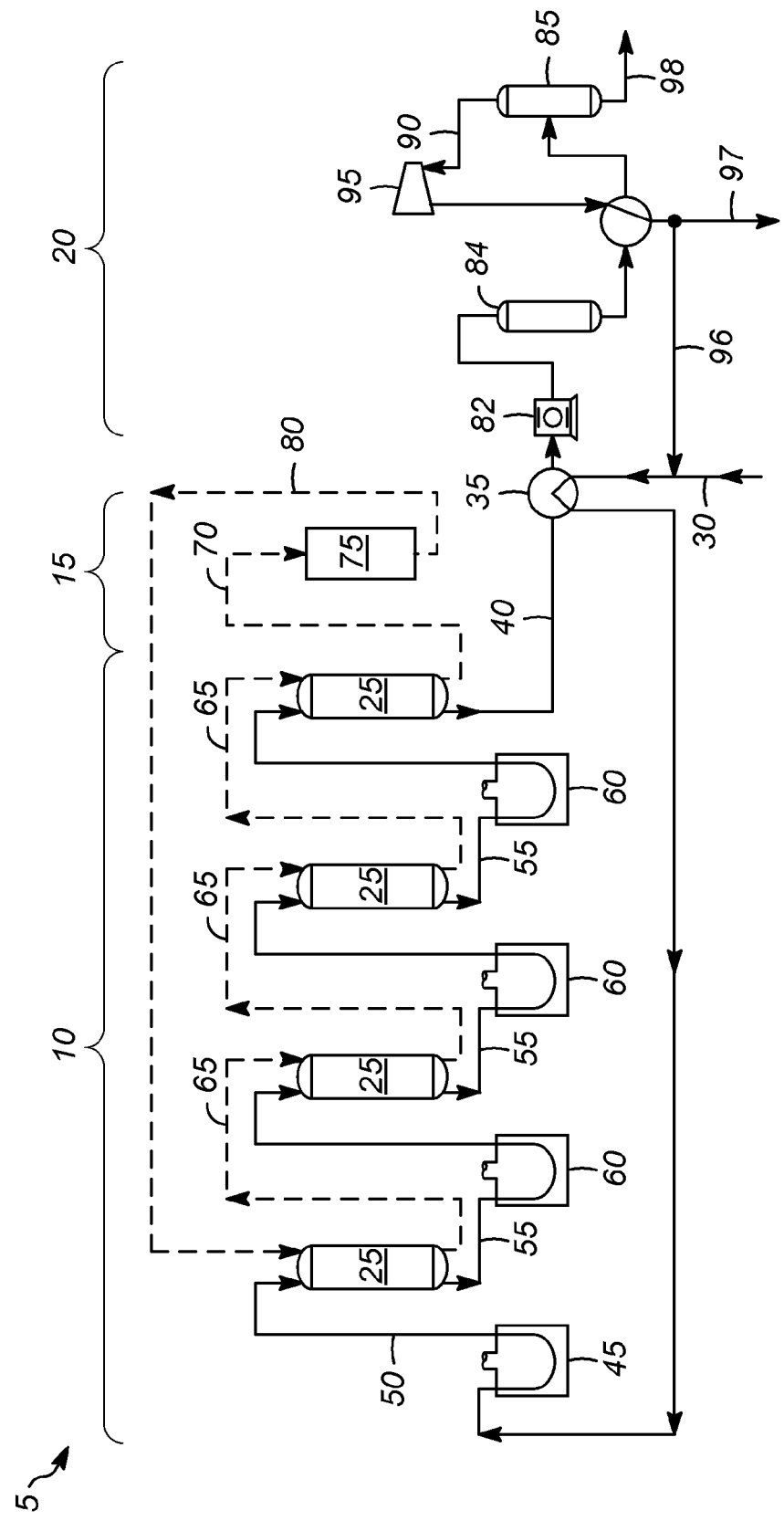
FIG. 1 is a general diagram of a process for catalytic dehydrogenation including integrated catalyst regeneration.

Example methods of the invention are suitable for regeneration of catalysts in processes that convert hydrocarbons to useful products. Particular example catalysts include dehydrogenation catalysts and reforming catalysts. An example dehydrogenation process integrated with a catalyst regeneration section 15 is shown in FIG. 1, and is described in more detail below. An example catalytic reforming process that can be integrated with an example catalytic regeneration process is disclosed in U.S. Pat. No. 5,498,756, to Micklich et al.

Figure 2:
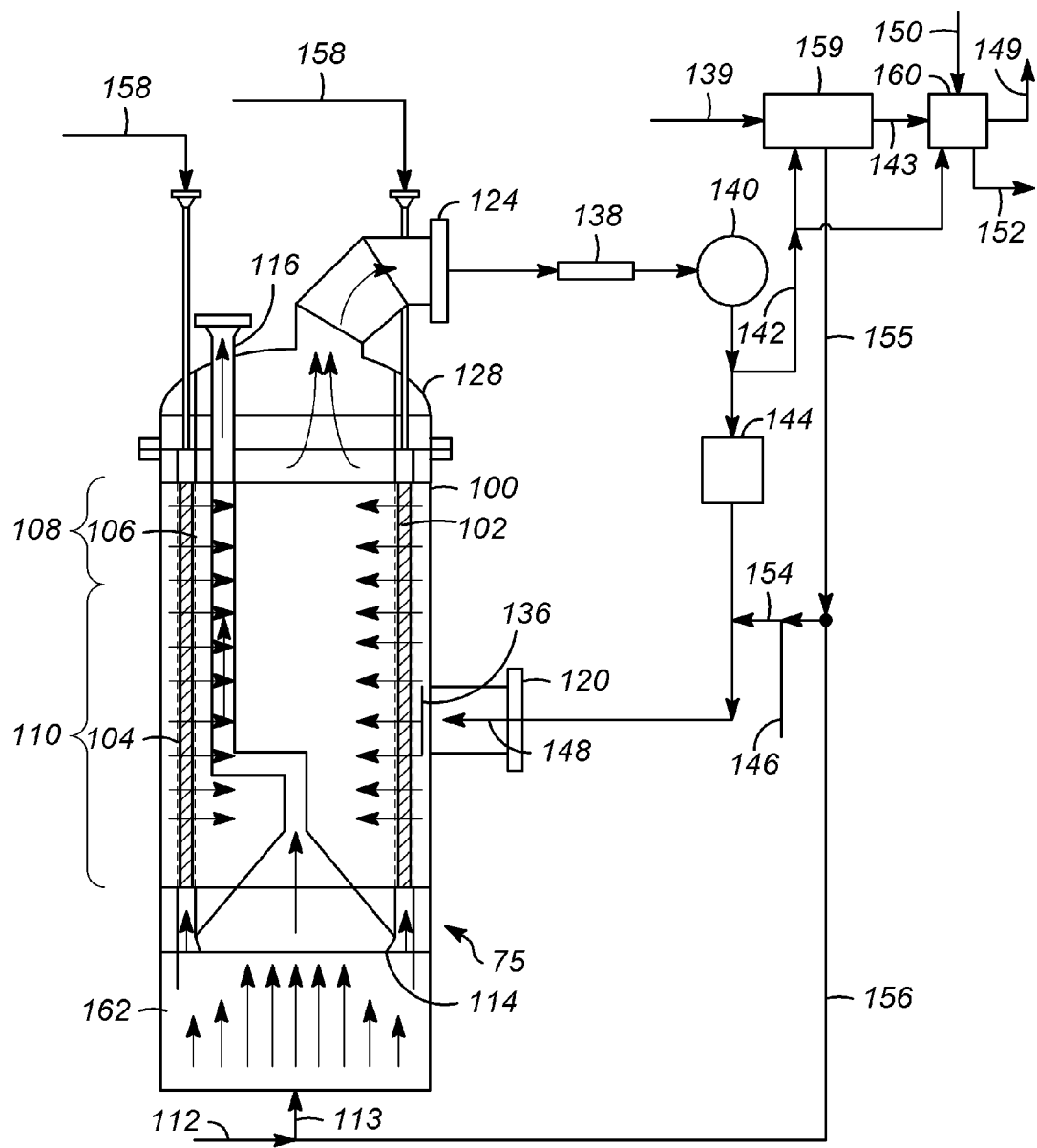
FIG. 2 is a schematic illustration of an embodiment regenerator, depicting an example regeneration process including a regeneration circuit according to an embodiment of the invention.

FIG. 2 shows an example catalyst regeneration continuous or semi-continuous system and process according to an embodiment of the invention. An example regenerator 75, which can be part of the catalyst regeneration section 15 or part of a catalytic reforming process, is embodied in a moving bed regenerator, and preferably a radial-flow regenerator. However, a fixed bed regenerator could instead be used. Typically, catalyst flows by gravity-assisted transfer through various zones in the regenerator 75 and then is withdrawn from the catalyst regeneration section 15 at temperatures usually no greater than about 200° C. (about 400° F.) and furnished to catalyst reactors, such as a dehydrogenation section 10 having dehydrogenation reactors 25 as shown in FIG. 1, or to a catalytic reforming section (not shown). Catalyst that is withdrawn from the catalyst regeneration section 15 can be termed regenerated catalyst.

The example radial-flow regenerator 75 includes a vessel 100 having a catalyst bed 102 disposed between an outer screen 104 and an inner screen 106. Spent catalyst enters the vessel 100 through catalyst inlets 158, and flows through a combustion zone within the vessel 100, which combustion zone generally includes an upper, oxygen-limited zone 108 and a lower, oxygen-excess zone 110. The oxygen-limited zone 108 and oxygen-excess zone 110 need not be, and preferably are not, separated from one another by a specific structure within the vessel 100. Within the oxygen-limited zone 108, all or nearly all of the oxygen present is consumed in coke removal, whereas within the oxygen-excess zone 110, oxygen remains in the gas for additional consumption of coke. It is contemplated that the regenerator 75 may have more than one combustion zone.

Movement of catalyst through the dehydrogenation reaction section 10 and the catalyst regeneration section 15 is often referred to as continuous though, in practice, it may be semi-continuous. Semi-continuous movement can mean the repeated transfer of relatively small amounts of catalyst at closely spaced points in time. As an example, one batch per minute may be withdrawn from the bottom of the dehydrogenation reactors 25 and withdrawal may take one-half minute, that is, catalyst will flow for one-half minute. If the inventory in the dehydrogenation reaction section 10 is large, the catalyst bed may be considered to be continuously moving. A moving bed system can have the advantage of maintaining production while the catalyst is removed or replaced.

A regenerator circuit is provided in an example embodiment to cycle a regeneration gas for the regeneration process. The regenerator circuit generally includes a circulating regeneration gas inlet 120, the vessel 100, a circulating regeneration gas outlet 124, and lines returning the circulating regeneration gas to the circulating regeneration gas inlet 120. The regeneration circuit can further include components such as a cooler 138, a blower 140, a heater 144, and a vent gas treatment system including an adsorptive drier 159 and a vent gas caustic wash tower 160. The circulating regeneration gas is maintained in this regeneration circuit for the regeneration process.

In an example, the regenerator circuit includes the circulating regeneration gas inlet 120, which feeds a circulating regeneration gas to the vessel 100. A baffle 136 may be provided for controlling input of the circulating regeneration gas through the circulating regeneration gas inlet 120. The circulating regeneration gas exits the vessel 100 through a circulating regeneration gas outlet 124 disposed at or near the top 128 of the vessel. The gas is introduced into the cooler 138, and then to the blower 140, where a portion of the gas can be discharged via line 142 to a vent gas treatment system, which in an example embodiment includes the adsorptive drier 159 and the vent gas caustic wash tower 160. The adsorptive drier 159 receives a drier purge stream ($N_2$) 139 and separates water from the vent gas 142 to control the water concentrations within the regenerator 75. An example drying process is disclosed in U.S. Pat. No. 6,290,916 to Sechrist et al. The adsorptive drier 159 outputs a drier product stream 155 including $CO_2$ to the regenerator 75, and further outputs a drier vent stream 143 including $N_2$ and $H_2O$ to the vent gas caustic wash tower 160, which also receives a caustic feed solution 150. The vent gas caustic wash tower 160 exhausts a purified vent stream 149 including $CO_2$, $N_2$, and $O_2$, as well as a spent vent gas treatment solvent 152 that includes $H_2O$, NaCl, sodium bicarbonate, and sodium bisulfate. Some $H_2O$ may remain in the drier product stream 155.

A portion of the drier product stream 155 is delivered as a co-feed 156, which is combined with a halogenation gas feed, such as but not limited to an oxy-chlorination gas feed 112, to provide a combined feed 113. This combined feed 113 is introduced to a halogenation section, such as but not limited to an oxy-chlorination catalyst reconditioning section 162 of the regenerator 75. The oxy-chlorination catalyst reconditioning section 162 redistributes platinum through chlorine ($Cl_2$) gas injection into an input stream provided by the oxy-chlorination gas feed 112. The oxy-chlorination catalyst reconditioning section 162 also dries the catalyst from moisture that is picked up within the combustion zone. The majority of gas from the oxy-chlorination gas feed 112 passes through a lower part 114 of the vessel 100, then through the lower catalyst bed 102, and through an interior of the vessel, exiting through the circulating regeneration gas outlet 124. The oxy-chlorination gas feed 112 can also be controlled to be routed through an internal hood assembly that exit from an upper vent 116.

Another portion of the drier product stream 155 is combined with a direct gas injection 146 into the regenerator circuit to provide a direct injection co-feed 154 to the combustion zone, directly supplementing the circulating regeneration gas. Additionally, another portion of the regeneration circuit vent stream 142 exiting the blower 140 is heated in a heater 144. This heated gas is combined with the direct injection co-feed 154, and is delivered to the circulating regeneration gas inlet 120 at line 148.

In the regeneration system shown in FIG. 2, an oxidant gas, such as air, $O_2$, CO, or $CO_2$, and more specifically air or $CO_2$, can be introduced into the regeneration circuit as injection media. Such oxidant gases can be introduced directly into the circulating gas inlet 120, such as via the direct gas injection 146, or from the integrated halogenation (e.g., oxy-chlorination) zone such as via the halogenation (e.g., oxy-chlorination) gas feed 112. These flows can be combined with the circulating regenerating gas to introduce circulating regeneration gas into the regenerator 75.

In a conventional regeneration process, air, which contains about 21% $O_2$ and about 79% $N_2$, is introduced to the regenerator 75 as injection media. For example, the oxy-chlorination gas feed 112 conventionally includes 0-21% oxygen. As another example, the direct gas injection 146 conventionally provides make-up gas that is 0-21% oxygen. Catalyst regenerators face operating constraints due to high temperature limits for either the catalyst or metallurgy of the outer screen 104. These temperature limits typically are managed by incorporating a large flowrate gas recycle circuit that restricts the concentration of oxygen within the inlet gas, e.g., at the circulating regeneration gas inlet 120, to create the oxygen-limited zone 108 of the regenerator 75. In a typical regeneration reaction, the circulating regeneration gas inlet 120 contains about 0.5-5.0% $O_2$, 18.7% $CO_2$, 4.7% $H_2O$, and the balance $N_2$. However, this also limits the kinetics of coke removal available within the oxygen-excess zone 110 of the regenerator 75.

The present invention overcomes this limitation by taking advantage of operating conditions that favor the thermodynamics and kinetics for removing carbon through secondary reactions with carbon dioxide and water. These secondary reactions form carbon monoxide and hydrogen and are endothermic. For example, by circulating $CO_2$ over coke, the $CO_2$ reacts with coke to form CO, which is a desirable reaction for removing the coke. This reduces the maximum temperature obtained within the regenerator 75 by promoting an endothermic reaction, the products of which are subsequently oxidized in at least an additional, secondary reaction, releasing an exotherm.

Conventional regenerator designs do not operate in a region that promotes these secondary reactions. In addition, carbon dioxide is known to have a significantly higher molar heat capacity than either nitrogen or oxygen. The present inventors have observed that these effects can combine to provide for around 20-60° C. of suppression to the oxidation exotherm.

The overall conversion capacity of a continuous or semi-continuous system for a catalyst regeneration process can be enhanced in an operation according to an embodiment of the invention by increasing the concentration of species that suppress the exotherm. This can be done by taking advantage of how oxygen fed to the regenerator forms $CO_2$ and $H_2O$. As stated above, conventional regeneration processes use air as the only injection media. By contrast, providing an injection media having a nitrogen concentration that is less than that of air, for example less than 75%, more preferably less than 50%, and most preferably less than 25%, nitrogen is purged from the circulating regeneration gas to increase the concentration of exotherm suppressants, including water and/or carbon dioxide, before introducing the circulating regeneration gas into the regenerator. Such exotherm suppressants in an example process have a combined concentration that is greater than 25%, more preferably greater than 50%, and most preferably greater than 75%.

In an embodiment, increasing exotherm suppressing species can be accomplished by using an injection media having an oxygen concentration that is greater than that of air. For example, in an embodiment, the oxygen concentration of the oxidant gas is at least 30%. In another embodiment, the oxygen concentration of the oxidant gas is at least 40%. In an embodiment, the oxygen concentration of the oxidant gas is at least 50%. In an embodiment, the oxygen concentration of the oxidant gas is at least 60%. In an embodiment, the oxygen concentration of the oxidant gas is at least 70%. In an embodiment, the oxygen concentration of the oxidant gas is at least 80%. In an embodiment, the oxygen concentration of the oxidant gas is at least 90%. In another embodiment, the oxygen concentration of the oxidant gas is 100%. By supplementing the circulating regeneration gas by providing injection media having a lower nitrogen concentration than air, alone or in combination with removing nitrogen from the regeneration circuit vent stream, e.g., stream 142, the steady-state levels of $CO_2$ and $H_2O$ will increase, which increases the secondary carbon oxidation routes. The improvement provided by the increased oxygen concentration in the oxidant gas can be balanced, for instance, with the cost of the oxygen. Co-feeds of active gases $CO_2$ and $H_2O$ can also be used in the injection media.

In a method of operating a continuous or semi-continuous system for a catalyst regeneration process, where the system includes a regenerator including a combustion zone and a halogenation zone, a catalyst is fed into the regenerator, and a circulating regeneration gas is introduced into the regenerator that includes oxygen. The circulating regeneration gas has a nitrogen concentration that is less than air. A first reaction takes place reacting oxygen in the circulating regeneration gas with coke to form exotherm suppressants water and carbon dioxide. This first reaction takes place at a temperature between about 300 and 800° C., more preferably between 400 and 700° C., and most preferably between 450 and 650° C. An exotherm results, which preferably is 50-200° C. from this temperature depending on the oxygen concentration in the circulating regeneration gas. A second reaction takes place with the carbon dioxide in the first reaction with the coke to remove coke and to form carbon monoxide and hydrogen. The second reaction preferably takes place at a temperature between about 400 and 900° C., more preferably between 450 and 800° C., and most preferably between 500 and 750° C. In an example embodiment, there is about a 20-100° C. endotherm from this temperature, dependent on the exothermic suppressant concentrations and reaction temperature. A third reaction can take place in which the carbon monoxide and hydrogen in the second reaction are reacted to form water and carbon dioxide. The third reaction takes place at a temperature between about 300 and 800° C., more preferably between 400 and 700° C., and most preferably between 450 and 650° C. The first and second reaction preferably take place in the oxygen-limited zone 108, and the third reaction preferably takes place in the oxygen-excess zone 110.

The higher inlet gas temperature range made available due to the additional secondary reactions taking place can result in a significant increase in regeneration capacity. For example, in a regeneration process in which pure oxygen (i.e., 100% $O_2$, 0% $N_2$) is used for the oxidant gas, the vented/recycled gas exiting the regenerator 75 contains about 1% $O_2$, 79.2% $CO_2$, 19.8% $H_2O$, and 0% $N_2$. By adjusting for the exotherm suppression through inlet gas temperature, the severity of regenerations in the oxygen-excess region 110 can more than double.

In some embodiments, catalytic materials are provided in desired levels to catalyze the gasification of surface carbon by species such as $CO_2$ and $H_2O$ in the second reaction (i.e., the reaction of the water and the carbon dioxide with the coke). Suitable catalytic materials include, but are not limited to, lithium, sodium, potassium, rubidium, cesium, or combinations thereof. These materials may be introduced into the regenerator 75 by incorporation into the inorganic carrier material. Optimizing the levels and performance of these species can further increase secondary reactions.

In some embodiments, the regenerator 75 is a radial-flow regenerator. However, other types of regenerators may be used, such as but not limited to a plug-flow reactor configuration. The radial-flow regenerator can include a catalyst bed disposed between inner and outer screens. In an embodiment, the catalyst is a dehydrogenation catalyst fed from a dehydrogenation reactor. In another embodiment, the catalyst is a reforming catalyst.

In an embodiment, an output circulating regeneration gas is vented. This output circulating regeneration gas has an increased carbon dioxide concentration, and a decreased nitrogen concentration, compared to a regeneration process utilizing air as the oxidant feed gas.

In an embodiment, a vented output circulating regenerator gas is conditioned, the vented output circulating regenerator gas comprising carbon dioxide, oxygen, steam, and halogen. The conditioned vented output circulated regenerator gas is recycled as an oxidant gas feed.

The catalyst regeneration processes disclosed herein can be used for a catalytic dehydrogenation process or a catalytic reforming process. An example catalytic dehydrogenation process is embodied in a moving bed dehydrogenation process 5 as shown in FIG. 1. The dehydrogenation of paraffinic hydrocarbons is well known to those skilled in the art of hydrocarbon processing. The process 5 includes a dehydrogenation reactor section 10, a catalyst regeneration section 15, and a product recovery section 20.

The dehydrogenation reactor section 10 includes one or more dehydrogenation reactors 25 (four are shown in FIG. 1). In the dehydrogenation process, fresh hydrocarbon feed 30 is combined with recycle hydrogen and unconverted hydrocarbons 96. Dehydrogenatable hydrocarbons preferably include isoalkanes having 3 or 5 carbon atoms. A suitable feed of dehydrogenatable hydrocarbons will often contain light hydrocarbons (i.e., those having less carbon atoms than the primary feed components), which, for the purpose of reaction, serve as contaminants. Along with the dehydrogenatable hydrocarbons, the feed to the dehydrogenation reactor section 10 comprises an $H_2$-rich stream, preferably containing at least 75 mol-% $H_2$. The $H_2$ acts to suppress the formation of hydrocarbonaceous deposits on the surface of the catalyst, more typically known as coke, and can act to suppress undesirable thermal cracking. Because $H_2$ is generated in the dehydrogenation reaction and comprises a portion of the effluent, the $H_2$-rich stream introduced into the dehydrogenation reaction zone generally comprises recycle $H_2$ derived from separation of the effluent 40. Alternately, the $H_2$ may be supplied from suitable sources other than the effluent 40.

In the dehydrogenation reactors 25, the combined stream of hydrogen and hydrocarbons is passed through a suitable bed of dehydrogenation catalyst maintained at the proper dehydrogenation conditions such as temperature, pressure and space velocity, and the effluent from the dehydrogenation reaction section 10 is processed further to yield a stream of olefinic hydrocarbons.

The dehydrogenation reaction is a highly endothermic reaction, which is typically effected at low (near atmospheric) pressure conditions. The precise dehydrogenation temperature and pressure employed in the dehydrogenation reaction section 10 will depend on a variety of factors, such as the composition of the paraffinic hydrocarbon feedstock, the activity of the selected catalyst, and the hydrocarbon conversion rate. In general, dehydrogenation conditions include a pressure of from about 0 MPa (0 bar) to about 3.5 MPa (35 bars) and a temperature of from about 480° C. (900° F.) to about 760° C. (1400° F.). A suitable hydrocarbon feedstock is charged to the dehydrogenation reaction section 10 and contacted with the catalyst contained therein at a liquid hourly space velocity (LHSV) of from about 1 hr−1 to about 10 hr−1. Hydrogen, principally recycle hydrogen, is suitably admixed with the hydrocarbon feedstock in a mole ratio of from about 0.1 to about 10. Preferred dehydrogenation conditions, particularly with respect to $C_3$-$C_5$ paraffinic hydrocarbon feedstocks, include a pressure of from about 0 MPa (0 bar) to about 0.5 MPa (5 bars) and a temperature of from about 540° C. (1000° F.) to about 705° C. (1300° F.), a hydrogen-to-hydrocarbon mole ratio of from about 0.1 to about 2, and an LHSV of less than 4 hr−1.

The dehydrogenation process may use any suitable dehydrogenation catalyst. Generally, preferred suitable catalyst comprises a Group VIII noble metal component (e.g., platinum, iridium, rhodium, and palladium), an alkali metal component, and a porous inorganic carrier material. The catalyst may also contain promoter metals, which advantageously improve the performance of the catalyst. The porous carrier material should be relatively refractory to the conditions utilized in the dehydrogenation reactors 25 and may be chosen from those carrier materials which have traditionally been utilized in dual function hydrocarbon conversion catalysts. A preferred porous carrier material is a refractory inorganic oxide, with the most preferred an alumina carrier material. The particles are usually spheroidal and have a diameter of from about 1/16 to about 1/8 inch (about 1.6 to about 3.2 mm), although they may be as large as about 1/4 inch (about 6.4 mm).

The dehydrogenation reaction in the dehydrogenation reactors 25 will produce a mixture of hydrogen and hydrocarbons. Normally, a portion of the hydrocarbons will include an equilibrium mixture of the desired olefin and its alkane precursor. The effluent from the dehydrogenation reaction section 10 passes to the product recovery section 20. This section removes hydrogen from the effluent and recovers it in high purity for recycle to the dehydrogenation reaction section 10. Separation steps for the removal of hydrogen will normally include cooling and compressing with subsequent cooling and flashing in a separation vessel. Such methods for the separation of hydrogen and light gases are well known by those skilled in the art.

A typical dehydrogenation process passes the combined hydrocarbon and hydrogen feed through the plurality of dehydrogenation reactors 25 with interstage heating between the dehydrogenation reactors. The feed hydrocarbons and hydrogen are initially heated by indirect heat exchange 35 with the effluent 40 from the dehydrogenation reaction section 10. Following heating, the feed mixture 30 normally passes through a preheater 45 to further increase the temperature of the feed components before the preheated feed 50 enters the dehydrogenation reactors 25, where it is contacted with the dehydrogenation catalyst. The endothermic reaction reduces the temperature of the reactants, which then undergo interstage heating at heaters 60 before entering the next dehydrogenation reactor. After the last dehydrogenation reactor (in this example the fourth reactor), the effluent 40 is sent to heat exchanger 35, and heat is exchanged with the feed 30. The effluent 40 is then sent to the product recovery section 20.

In the product recovery section 20, the effluent 40 is compressed at compressor 82. Chloride can then be removed at chloride treater 84. The effluent is then dried, and separated in separator 85. The gas 90 is expanded in expander 95 and then separated into a recycle hydrogen stream 96 and a net separator gas stream 97. The liquid stream 98, which includes the olefin product and unconverted paraffin, is sent for further processing, where the desired olefin product is recovered and the unconverted paraffin is recycled to the dehydrogenation reactor section 10.

The catalyst 65 moves through the series of dehydrogenation reactors 25. The dehydrogenation reactions result in the accumulation of hydrocarbonaceous material (coke) on the catalyst, as discussed above. The coke clogs up pores on the catalyst surface, which interferes with the catalyst's ability to promote the dehydrogenation reaction, resulting in spent catalyst. Thus, when the catalyst 70 leaves the last dehydrogenation reactor 25, it is sent to the catalyst regeneration section 15, for removal of coke. The catalyst regeneration section 15 can include a regenerator such as the regenerator 75 shown in FIG. 2. Regenerated catalyst 80 is sent back to the first dehydrogenation reactor 25.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of operating a continuous or semi-continuous system for a catalyst regeneration process, the system comprising a regenerator, the regenerator comprising a combustion zone and a halogenation zone, the method comprising:
   feeding the catalyst into the regenerator;
   introducing a circulating regeneration gas into the regenerator including oxygen, the circulating regeneration gas having a nitrogen concentration that is less than air;
   reacting the oxygen within the circulating regeneration gas with the coke to remove coke and to form water and carbon dioxide; and
   reacting the water and the carbon dioxide formed in the first reaction with the coke to remove coke and to form carbon monoxide and hydrogen.

2. The method of claim 1 wherein the nitrogen concentration is less than 75%.

3. The method of claim 1 wherein the circulating regeneration gas comprises exotherm suppressants, the exotherm suppressants comprising water and carbon dioxide;
   wherein a concentration of the combined exotherm suppressants is higher than a combined concentration of the exotherm suppressants in air.

4. The method of claim 3, wherein a combined concentration of exotherm suppressants is greater than 25%.

5. The method of claim 1, wherein said introducing a circulating regeneration gas comprises introducing an injection media into the regenerator.

6. The method of claim 5, wherein said introducing a circulating gas comprises introducing the injection media at a direct gas injection into a regenerator circuit.

7. The method of claim 5, wherein said introducing a circulating gas comprises introducing the injection media into the halogenation zone.

8. The method of claim 7, wherein the halogenation zone comprises an oxy-chlorination zone.

9. The method of claim 1 further comprising:
purging nitrogen from the circulating regeneration gas before said introducing the circulating regenerating gas into the regenerator.

10. The method of claim 9, wherein said purging nitrogen comprises:
drying a regeneration circuit vent stream to provide a drier vent stream; and
returning at least a portion of the drier vent stream to a regeneration circuit.

11. The method of claim 1 wherein the first reaction takes place at a temperature between about 300 and 800° C.

12. The method of claim 1 wherein the secondary reaction takes place at a temperature between about 400 and 900° C.

13. The method of claim 1 wherein the combustion zone comprises an oxygen-limited zone and an oxygen-excess zone.

14. The method of claim 13 wherein the reacting of carbon monoxide and hydrogen formed in the secondary reaction are reacted to form water and carbon dioxide.

15. The method of claim 14 wherein the third reaction takes place at a temperature between about 300 and 800° C.

16. The method of claim 1 further comprising:
introducing a catalytic species into the regenerator for catalyzing the secondary reaction.

17. The method of claim 16 wherein the catalytic species comprises an alkali metal, wherein the alkali metal comprises lithium, sodium, potassium, rubidium, cesium, or combinations thereof.

18. The method of claim 1 wherein the catalyst is fed from a reactor taken from the group consisting of a dehydrogenation reactor and a catalyst reforming reactor.

19. A catalytic regeneration process for a spent catalyst, the process comprising:
feeding the spent catalyst to a continuous or semi-continuous regenerator, the spent catalyst having coke on a surface, the regenerator comprising a combustion zone and a halogenation zone;
introducing a circulating regeneration gas into the regenerator, the circulating regeneration gas having a nitrogen concentration less than 75%;
reacting the coke with oxygen within the circulating regeneration gas to remove coke on the spent catalyst and to form at least one exotherm suppressing species, the first reaction being exothermic;
reacting the coke with the exotherm suppressing species to further remove coke on the spent catalyst, the second reaction being endothermic.

20. The catalytic regeneration process of claim 19, wherein said introducing a circulating regeneration gas comprises:
introducing an injection media into a regeneration circuit circulating regeneration gas into the regenerator, the injection media having a nitrogen concentration that is less than air;
wherein said introducing takes place at one of via a direct gas injection into the regeneration circuit and via a halogenation zone of the regenerator.

* * * * *